Figure 5:
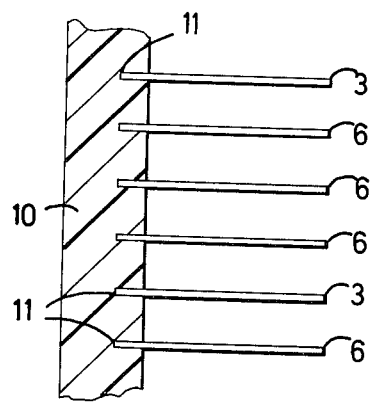

United States Patent [19]

Vlastos et al.

[11] 4,259,093
[45] Mar. 31, 1981

[54] ELECTROSTATIC PRECIPITATOR FOR AIR CLEANING

[75] Inventors: Antonios Vlastos, Sala; Peter Albertsson, Lidingö; Rolf Eriksson, Bromma, all of Sweden

[73] Assignee: Elfi Elektrofilter AB, Lidkoping, Sweden

[21] Appl. No.: 968,770

[22] Filed: Dec. 12, 1978

Related U.S. Application Data

[63] Continuation of Ser. No. 783,543, Apr. 1, 1977, abandoned.

[30] Foreign Application Priority Data

Apr. 9, 1976 [SE] Sweden .................. 7604248

[51] Int. Cl.³ ..................... B03C 3/08; B03C 3/12
[52] U.S. Cl. .................... 55/137; 55/143; 55/145; 55/146; 55/138; 55/150
[58] Field of Search ............ 55/13, 123, 129, 130, 55/135–138, 143, 145, 146, 11, 150; 361/229, 230

[56] References Cited

U.S. PATENT DOCUMENTS

| | | | |
|---|---|---|---|
| 1,697,316 | 1/1929 | Horny | 55/145 |
| 2,086,063 | 7/1937 | Brion et al. | 55/123 |
| 2,318,093 | 5/1943 | Penney | 55/136 |
| 2,588,699 | 3/1952 | Carlson | 361/229 |
| 2,642,952 | 6/1953 | Landgraf | 55/143 |
| 2,900,042 | 8/1959 | Coolidge, Jr. et al | 55/136 |
| 2,946,887 | 7/1960 | Castle, Jr. | 55/136 |
| 3,026,964 | 3/1962 | Penney | 55/138 |
| 3,707,828 | 1/1973 | Burney | 55/143 |
| 3,778,970 | 12/1973 | Summer et al. | 55/137 |
| 4,022,594 | 5/1977 | Baysek | 55/146 |
| 4,119,416 | 10/1978 | Aayashi et al. | 55/136 |

FOREIGN PATENT DOCUMENTS

| | | | |
|---|---|---|---|
| 1387666 | 5/1965 | France | 55/137 |
| 99669 | 1/1962 | Norway | 55/136 |

OTHER PUBLICATIONS

H. White, Industrial Electrostatic Precipitation Apr. 1, 1969, p. 189, Addison-Wesley Publishing Co., Inc.

*Primary Examiner*—David L. Lacey
*Attorney, Agent, or Firm*—Le Blanc, Nolan, Shur & Nies

[57] ABSTRACT

An electrostatic precipitator for air cleaning wherein the air passes through in two steps: first passing through a charging portion and next through a separation portion. The charging portion includes wires positioned parallel to and between parallel metal sheets, the wires having an electric potential other than that of the metal sheets. The separation portion includes plural parallel metal sheets, each of which has an electric potential other than that of adjacent metal sheets. The charging portion includes two or more wires between each pair of metal sheets, and the metal sheets of the charging portion extend through and constitute some of the metal sheets of the separation portion, between which are disposed addition metal sheets of an odd number.

10 Claims, 10 Drawing Figures

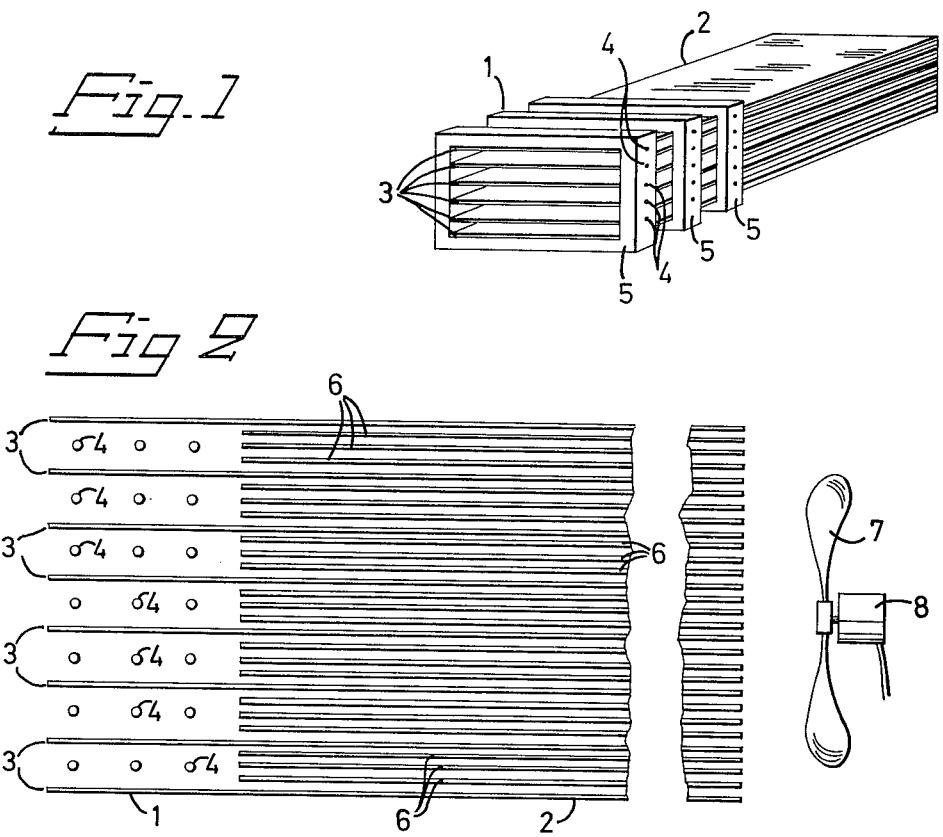
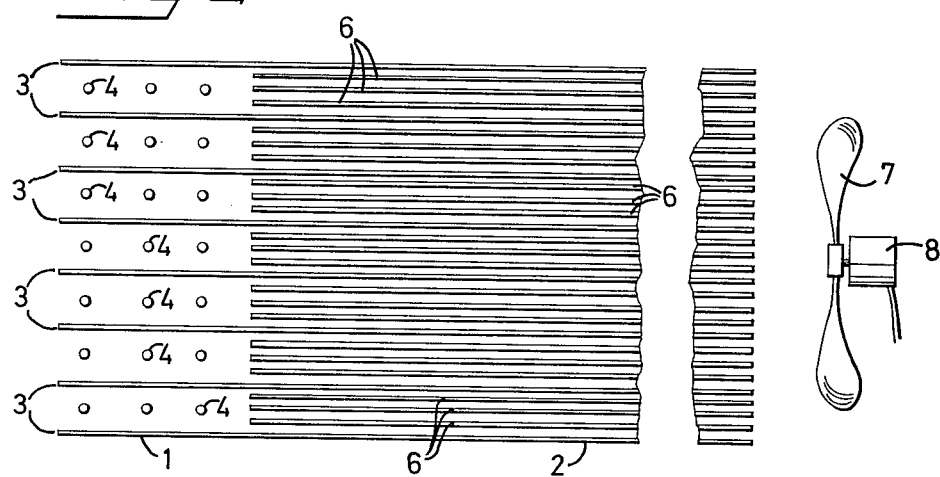
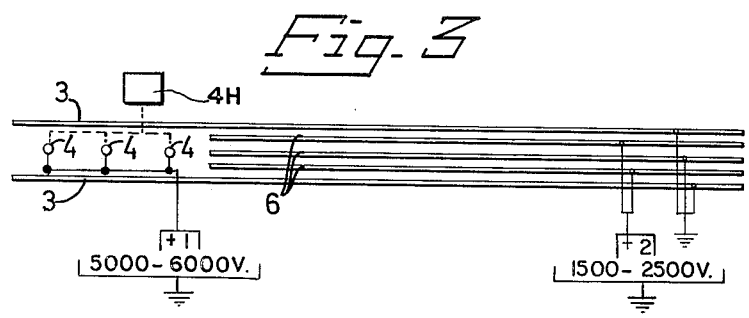
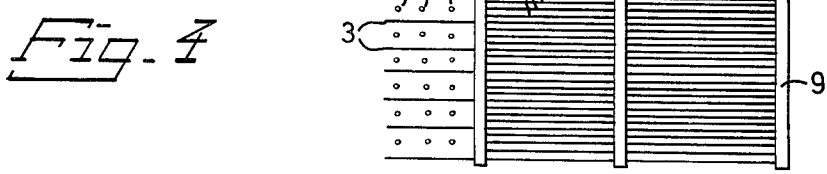

ELECTROSTATIC PRECIPITATOR FOR AIR CLEANING

CROSS REFERENCE TO RELATED APPLICATION

This application is a continuation of application Ser. No. 783,543, filed Apr. 1, 1977, now abandoned.

BACKGROUND OF THE INVENTION

This invention relates to an electrostatic precipitator for the cleaning of air.

Electrostatic precipitators for air cleaning are based on the principle that particles, which to a large extent are not charged, upon entering the precipitator are charged in a first stage when passing between two electric conductors, such as a wire and two metal sheets positioned one on each side of the wire, where the sheets and the wire have different electric potentials. A particle thus charged is thereafter separated from the air stream, for example, the air stream with a charged particle passes between two metal sheets with different electric potentials whereupon the charged particle is attracted to one of the sheets which has a polarity opposite to that of the particle.

The efficiency of an electrostatic precipitator depends to a very high degree on the dimensioning of the charging stage in relation to the separation stage. Attempts have heretofore been made to increase the capacity of the electrostatic precipitator by increasing the field strength at the charging and separation stage and by extending the separation stage. These measures increase the capacity of a precipitator, but only to a certain level, because on one hand the field strength cannot be increased indefinitely and on the other hand the separation stage must be increased substantially, if a decisive difference in efficiency is to be obtained.

A great disadvantage arising in connection with an increase of the potential in the charging stage is the increase in ozone production.

Electrostatic precipitators at present commercially available separate 50–60% of the particles entering the precipitator. The electrostatic precipitator according to the present invention separates up to 97% of the entering particles.

The present invention relates to an electrostatic precipitator for air cleaning which comprises a charging portion, a separation portion and a potential supply means, said charging portion including wires, which are positioned between parallel grounded metal sheets and have an electric potential other than that of the metal sheets, and said separation portion including additional parallel metal sheets, each of which has an electric potential other than that of adjacent metal sheets (as will be hereinafter described), and said charging portion including two or more wires between each pair of metal sheets.

The invention is characterized thereby that the relative distance C between two or more wires located between two of said parallel metal sheets lies within the interval described by the formula $C = (V \cdot T)/(n-k)$ where $k \epsilon \{0, n-2\}$ and V is the particle speed, T is the cycle time for a varying direct potential generated by the potential supply means, and n is the number of wires, and that the distance C preferably is chosen within the interval $0.6 \cdot b \leq C \leq 1.2 \cdot V \cdot T/2$ where b is the distance between each wire and the surrounding metal sheets.

Figure 6:
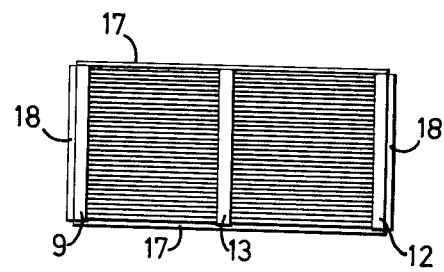
Figure 7:
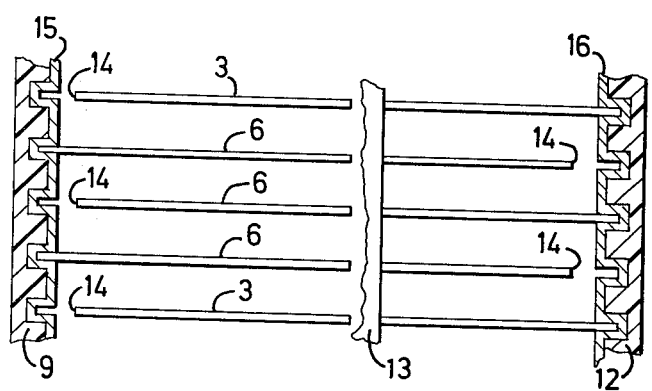
Figure 8:
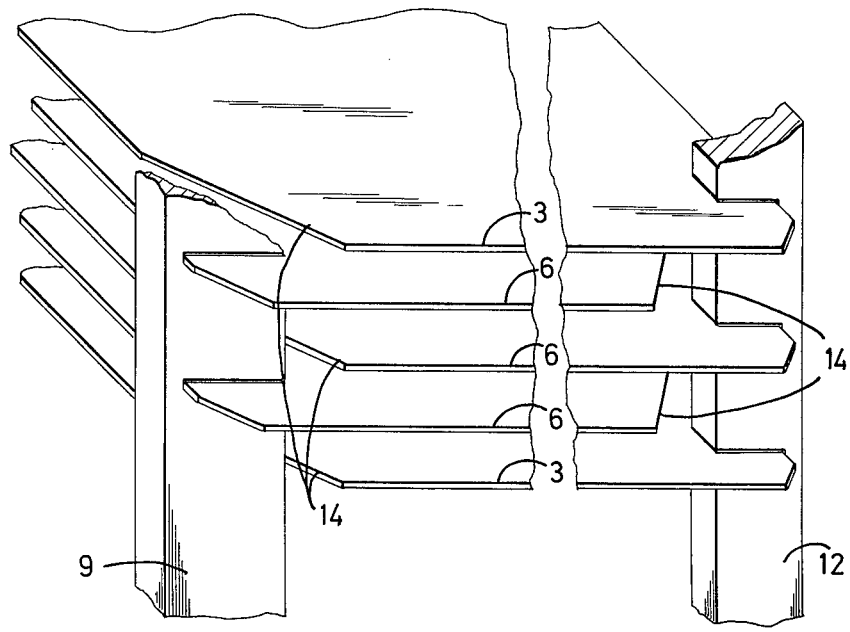
Figure 9:
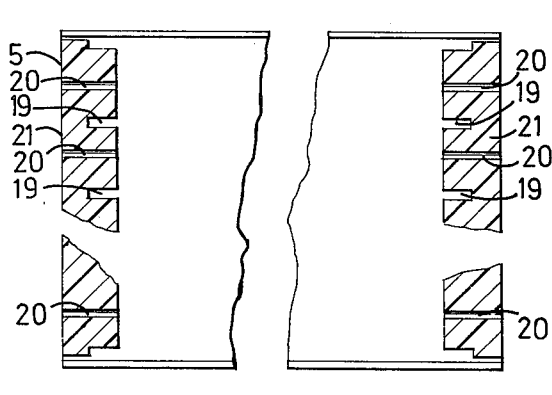
Figure 10:
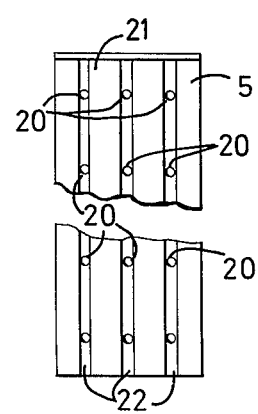

The invention is described in greater detail in the following, with reference to the accompanying drawings, in which FIG. 1 is a perspective, somewhat diagramatic view of an electrostatic precipitator according to the invention, FIG. 2 is a schematic lateral view of the electrostatic precipitator, FIG. 3 shows an element of the electrostatic precipitator, FIG. 4 is a lateral view of the electrostatic precipitator showing retaining means, FIG. 5 is a detail view of a retaining means, FIG. 6 is a view of the rear side of the electrostatic precipitator, FIGS. 7 and 8 show retaining means with electric conductors, FIG. 9 shows a frame associated with the charging portion of the electrostatic precipitator, FIG. 10 shows said frame seen from the right to the left in FIG. 9.

In FIG. 1 an electrostatic precipitator according to the invention is shown by way of a perspective view. The precipitator comprises a charging stage 1 and a separation stage 2. In common to the charging stage 1 and separating stage 2, straight through metal sheets 3 are provided, as also can be seen in FIG. 2. The number of these sheets 3 can be varied during assembly of an electrostatic precipitator. Between each pair of sheets 3 in the charging stage wires 4 are located, each of which is positioned in parallel with enclosing sheets 3 and substantially centrally spaced between the same. The wires 4 are clamped in frames 5 of insulating material, and each frame holds a vertical column of wires. Each frame 5 (see FIG. 9) is preferably fastened on the metal sheets 3, the sides of which face toward a frame. The diameter of the wires is of the magnitude 0.05–0.25 mm. A thinner wire yields less ozone than a thicker wire at equal corona current, but the strength of the wire decreases. Between each pair of said through sheets 3, a number of additional metal sheets 6 are provided in the separation stage 2. In FIG. 2 three such sheets 6 are shown between each pair of through sheets 3. The number of sheets 6 may be an odd number from 1 upward and is determined by the distance between the sheets 3, the available potential to the sheets 6 and the field strength desired between the sheets 3 and 6 and between two sheets 6, in the case of more than one sheet. The potentials of the sheets 3 and 6 are apparent from the description below. The number of sheets may be between one and seven. The sheets 3, 6 have a thickness of, for example, 0.5 mm and may be manufactured of aluminium, copper, steel or another suitable material, preferably aluminium. The air to pass through the charging stage and thereafter through the separation stage is drawn into the forward end wall of the precipitator by means of a fan 7 located behind the rear end wall of the precipitator and driven by an electric motor 8.

The electrostatic precipitator, except for its forward and rear end walls, is provided with walls (see FIG. 6), so that the air can pass through the precipitator only in the way described.

The through sheets 3 have an electric potential (ground) different from that of the wires 4 which, as indicated in FIG. 3, is +1. The shorter sheets 6 located closest to the through sheets 3 have the same polarity as the wires 4, but the potential of the sheets 6 is determined according to above by the distance between the sheets and the desired field strength in the separation section. Every second sheet 6, counted from sheet 3, has the same potential as sheet 3 and, consequently, every second sheet counted from the sheet 6 located closest to sheet 3 has the same potential $+_2$ as this sheet 6. This implies, thus, that every second sheet in the separation stage has the same potential. All units with the same potential are coupled in parallel as shown in FIG. 3.

The potential sources are grounded to the chassis which, thus, feeds then the two potentials to the precipitator.

The difference in electric potential between wires 4 and sheets 3 is of the magnitude 5000-6000 V.

The difference in electric potential between adjacent sheets in the separation section is of the magnitude 1500-2500 V.

The electrostatic precipitator according to the invention is fed with potential from a rectifier with an alternating potential superimposed in known manner on the direct potential.

The superimposed alternating potential is of such an amplitude, that the critical value for receiving ultracorona is exceeded only at the top value of the pulsated direct potential. As a result thereof, a pulsated ultracorona is obtained which yields a substantially lower ozone generation.

At the embodiment shown in FIG. 3 where an element is illustrated, one electric potential is positive and the other potential is ground.

Operational principle is that uncharged particles are charged at the passage through the charging portion 1 between a wire 4 and a sheet 3 by ions in the electric field therebetween. A particle after having been statically charged in this manner to a positive or negative potential passes into the separation portion 2 and is there attracted against a grounded sheet when the particle is charged positively and against a sheet with positive potential when the particle is charged negatively. The particles, thus, are collected in the separation portion 2, which is cleaned when necessary, and air with a substantially lower particle concentration than ingoing air flows out of the precipitator through the rear end wall of the separation portion 2.

Extensive attempts have been made, as mentioned above, to increase the capacity of electrostatic precipitators. An increase of the field strength results in an increased risk of flash-over between a wire 4 and a sheet 3. At accumulation of particles and dust this risk increases particularly in the separation portion, but also in the charging portion. Flash-over occurs often at high potential, and as a result thereof ozone is produced which is highly unhealthy. Besides, a highly disturbing noise of crackling type is produced, and also the risk of ignition increases.

Another way of increasing the efficiency is to extend the separation step. This measure, however, increases the efficiency only to a small degree, because only charged particles are collected, while uncharged particles pass through.

By the present invention the efficiency, compared with conventional devices, is increased from a separation value of 50-65% of ingoing particles to a value of up to 97%.

At the present invention a series of equal charging means are located one after the other in the flow direction of the air. In FIG. 3, three charging units are by way of example shown positioned to the side of each other. Each unit consists of wires 4 clamped in a frame 5. The number of charging units can to some extent be varied in view of the desired efficiency. The minimum number is two, and when more than five units are used no appreciable efficiency increase is obtained. Three units ensure a charging of ingoing particles to almost 100%.

At the charging of particles with a pulsating direct potential according to above which generates an ultracorona, this is generated only when the direct potential level lies above a certain value. This implies that ingoing particles are charged at their passage past a wire only when the direct potential value lies above the value for which corona is formed.

When several wires are placed one after the other in the charging portion, the efficiency can be increased substantially by a correct dimensioning of the number of wires, and above all of the distance between the same.

The distance between the wires shall be such that a particle, which is not charged at the first wire, will be charged when it passes one of the subsequent wires.

An interval concerning the distance between two adjacent wires is described according to the formula below where the optimum distance depends on the number of wires. The distance cannot be chosen to be of too small a size, because at small distances a degenerating effect on the corona is obtained, i.e. a lower corona current is obtained.

When T is the cycle time for the pulsating direct potential, V is the particle speed, which is equal to the air speed in the precipitator, n the number of wires, and b is the distance between each wire 4 and surrounding sheets 3, the distance C between the wires can be written $$C=(V\cdot T)/(n-k) \text{ where } k\epsilon\{0, n-2\}$$

and where $2 \leq n \leq 5$

With respect, among other things, to decreasing corona current, it has been found by experiments that a suitable distance between the wires lies within the interval $0.6\cdot b \leq C \leq 1.2\cdot(V\cdot T)/2$ A substantially improved efficiency of the charging portion according to the present invention is obtained by heating the wires. The wires can be heated by any known means, shown diagrammatically as 4H in FIG. 3. The heating of the wires provides a lower air density in the vicinity of the wires, and thereby more ions per time unit can be thrown out from the immediate vicinity of the wires.

By this heating, by an optimum relative positioning of the wires and by an optimum number of frames with wires, the device according to the present invention yields a charging of almost 100% of the ingoing particles.

By selecting the length of the separation stage 2 in relation to applied potential and air speed, against the background that almost 100% of all particles are charged, an electrostatic precipitator is obtained which has a separation efficiency of almost 100%. The length of the separation step suitably is selected to be about 2 to 5 times, preferably 3 times, that of the charging stage.

As mentioned above, flash-over produces ozone. At known electrostatic precipitators each of the sheets 3,6 in the separation stage is separated by means of insulators positioned uniformly over the surface of the sheets. Due to the location of the insulators, dust collects thereon, and flash-over by creep discharge occurs on the outside of the insulators. Owing to the flash-over risk, a lower potential must be used. Moreover, the air flow is disturbed by non-uniform turbulence produced about each insulator.

The distance between the sheets 3,6 in the separation portion 2 is such that the critical potential for flash-over between two adjacent sheets 3, 6 in the separation portion 2 is the same as between a wire 4 and adjacent sheets 3 in the charging portion 1.

At the present invention, the sheets 3, 6 in the separation stage 2 are spaced apart from and retained in parallel relative to each other by holders 9, 10 designed as rods (or bais) of insulating material, as shown in FIGS. 4 and 5, provided with grooves 11, into which the sheets 3, 6 are inserted. The holders are connected to an upper and a lower cover metal sheet 17 and to side metal sheets 18 for the precipitator. The cover sheets preferably have a thickness of 1–2 mm. At the rear end wall of the precipitator holders 9 and 12 are provided, one in each corner, and a holder 13, if necessary, is provided at the center of the end wall. Each sheet 3, 6 is retained in a groove 11 in the holders 10 on the longitudinal sides of the precipitator and in the holders 9,12 and 13 on the rear end wall of the precipitator. Each of the holders, 9, 12 on the rear end wall of the precipitator retains only those sheets which have the same electric potential. The corners 14 on the sheets 3, 6 which are not intended to be retained by one of the two rear holders 9, 12 are cut off, as shown in FIGS. 7 and 8.

An electric conductor 15, 16 such as a strip, for example, of copper or aluminium, extends along each of the holders 9, 12 in the corners, in such a manner, that the conductor is folded down into each groove 11. Thus, only the sheets 3, 6, the corners of which are not cut off, contact the said conductor 15, 16. As appears from FIG. 7, thus, the sheets 3, 6 with one electric potential are connected in parallel with each other through the conductor 16 in one holder 12, and the sheets 3, 6 with the other electric potential are connected in parallel with each other through the conductor 15 in the other holder 9.

Three electric potentials occur, preferably two positive potentials and ground. The wires 4 in the different frames 5 are connected to each other and further through an electric conductor to a coupling place (not shown) in the rear part of the precipitator. The sheets 6, to which potential is to be applied via one of the electric conductors, 15, 16, are fed from a second coupling place in the rear part of the precipitator. The grounding of sheets 3 and 6 is effected by the other conductor 15, 16, which is in contact with the lower and the upper cover sheet 17, which are grounded via their pressure against the chassis. Each frame 5 for retaining the wires 4 is made of insulating material, and the sides in the frame are provided with grooves 19, so that the frame can be pushed on the through sheets 3, see FIG. 9. The sides of the frame 5 are provided with through holes 20, into which the wire 4 is threaded. On the outer sides 21 of the frame 5 grooves 22 (see FIG. 10) are fastened which connect the holes and into which the wire is positioned to protect it against external damage.

The retaining of the sheets 3, 6 at their outer edges, as described above, involves great advantages. One advantage is that the risk of potential flash-over between two sheets is reduced, because no creep currents along insulators occur. In order to increase still more the insulation capacity at the present invention between the sheets 3, 6 in the grooves 11, the projecting portion between the grooves 11 can be designed as a wedge some distance in between adjacent sheets in order to increase the distance for creep currents. A smaller number of flash-overs yields a lower ozone production. A further advantage in this connection is, that the potential between two adjacent sheets 3, 6 can be increased compared with when insulators are located therebetween, which increases the efficiency of the separation stage. The air flow, furthermore, is not disturbed by insulators provided between the sheets. The air flow thereby is laminar at very low flow rates and uniformly turbulating at higher flow rates. This is favorable to uniform precipitation of particles on the sheets 3, 6. Further advantages are that the manufacture of the precipitator and the cleaning of the separation stage are facilitated substantially.

The invention must not be regarded restricted to the embodiment described above, but can be varied within the scope of the attached claims.

We claim:

1. An electrostatic precipitator for air cleaning, comprising, a charging portion, a separation portion and a potential supply means connected to said charging and separation portions; said charging portion includes wires parallel to and located between a first plurality of mutually parallel metal sheets and having an electric potential different from said sheets, and which separation portion includes additional mutually parallel metal sheets between said first sheets, each of all said sheets having an electric potential different from adjacent sheets; said charging portion including two or more of said wires between each pair of said first sheets, and wherein the relative distance C between two or more of said wires located between two of said first parallel metal sheets lies within the interval described by the formula $C=(VT)/(n-k)$ where $k\epsilon\{0,n-2\}$ and where V is the particle speed, T the cycle time for a varying direct potential generated by the potential supply means, and where n is the number of wires, and that the distance C preferably is selected within the interval $0.6 \cdot b \leq C \leq 1.2 \cdot (V \cdot T)/2$ where b is the distance between each wire and the adjacent said first parallel sheets; retaining means provided for said sheets comprising rods provided with grooves into which the edges of said sheets are inserted; and electric conductors of strip-shape extend along two of said rods and are folded down into said grooves.

2. An electrostatic precipitator according to claim 1, wherein the number of wires between two mutually parallel sheets is from two to five.

3. An electrostatic precipitator according to claim 1, wherein rectangular frames with four beams are provided, and in which said wires are clamped, each said frame including a column of said wires perpendicularly to the longitudinal extension of said sheets, and wherein for each said wire a through hole is drilled in opposite beams of a said frame, and the column of wires is formed by a single line which passes alternately between two sheets and alternately on the outside of the said frame.

4. An electrostatic precipitator according to claim 1, wherein the length of the separation portion is three times that of the charging portion.

5. An electrostatic precipitator according to claim 1, wherein the charging portion and the separation portion have in common said first parallel sheets comprising a number of longer through sheets extending through both said portions, and that in the separation portion the said additional sheets are a number of shorter sheets arranged mutually parallel and parallel with said through sheets.

6. An electrostatic precipitator according to claim 5, wherein the number of shorter sheets in the precipitator is an odd number of sheets from one to seven between adjacent through sheets.

7. An electrostatic precipitator according to claim 1, wherein one of the corners of each sheet located farthest away from the charging portion is cut off, and more specifically a corner at one side is cut off from the sheets having one electric potential and the corner at the opposite side is cut off from the sheets having the other electric potential, and the corners which are not cut off, are inserted in said grooves in an adjacent rod provided with said electric conductor whereby alternate sheets engage opposite ones of the rods with electric conductors.

8. An electrostatic precipitator according to claim 1, wherein the potential supply means delivers two varying direct potential levels, one to said wires and one to alternate ones of said sheets, which two direct potential levels are positive, and a third potential level which is ground and is connected to those of said sheets disposed between said alternate one of said sheets.

9. An electrostatic precipitator for air cleaning, comprising: a charging portion, a separation portion and a potential supply means connected to said charging and separation portions, which charging portion includes wires parallel to and located between a first plurality of mutually parallel metal sheets and having an electric potential different from said sheets, and which separation portion includes additional mutually parallel metal sheets between said first sheets, each of all said sheets having an electric potential different from adjacent sheets, and said charging portion including two or more of said wires between each pair of said first sheets, and wherein the relative distance C between two or more of said wires located between two of said first parallel metal sheets lies within the interval described by the formula $C=(V \cdot T)/(n-k)$ where $K \epsilon \{0, n-2\}$ and where V is the particle speed, T the cycle time for a varying direct potential generated by the potential supply means, and where n is the number of wires, and that the distance C preferably is selected within the interval $0.6 \cdot b \leq C \leq 1.2 \cdot (V \cdot T)/2$ where b is the distance between each wire and the adjacent said first parallel sheets; and heat means are provided for said wires in order to reduce the density of the air surrounding the wires to thereby yield a higher ion production from the immediate vicinity of the wires.

10. An electrostatic precipitator for air cleaning, comprising, a charging portion, a separation portion and a potential supply means connected to said charging and separation portions, which charging portion includes wires parallel to and located between a first plurality of mutually parallel metal sheets and having an electric potential different from said sheets, and which separation portion includes additional mutually parallel metal sheets between said first sheets, each of all said sheets having an electric potential different from adjacent sheets, and said charging portion including two or more of said wires between each pair of said first sheets, wherein the relative distance C between two or more of said wires located between two of said first parallel metal sheets lies within the interval described by the formula $C=(V \cdot T)/(n-k)$ where $k \epsilon \{0, n-2\}$ and where V is the particle speed, T the cycle time for a varying direct potential generated by the potential supply means, and where n is the number of wires, and that the distance C preferably is selected within the interval $0.6 \cdot b \leq C \leq 1.2 \cdot (V \cdot T)/2$ where b is the distance between each wire and the adjacent said first parallel sheets, and wherein the distance between the sheets in the separation portion is dimensioned so the critical potential for flash-over between two adjacent sheets in the separation portion is the same as that between a wire and adjacent sheets in the charging portion.

* * * * *